(12) United States Patent
Sato et al.

(10) Patent No.: US 6,219,324 B1
(45) Date of Patent: *Apr. 17, 2001

(54) DISK CARRIER WITH LEVERS HOLDING AND CARRYING A DISK IN HORIZONTAL DIRECTION

(75) Inventors: Shogo Sato; Takashi Nakai; Masayuki Saitoh, all of Tokorozawa (JP)

(73) Assignee: Pioneer Electronic Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,212

(22) Filed: Sep. 19, 1997

(30) Foreign Application Priority Data

Sep. 30, 1996 (JP) .................................................. 8-259732
Aug. 7, 1997 (JP) .................................................. 9-213738

(51) Int. Cl.[7] .................................................. G11B 33/02
(52) U.S. Cl. .................................................. 369/75.2; 369/77.1
(58) Field of Search .................................................. 369/75.1, 75.2, 369/77.1, 77.2

(56) References Cited

U.S. PATENT DOCUMENTS

| | | | |
|---|---|---|---|
| 4,498,162 | 2/1985 | Schatteman | 369/77.1 |
| 4,513,409 | 4/1985 | Staar | 369/77.1 |
| 4,641,298 * | 2/1987 | Ikedo et al. | 369/77.1 |
| 4,674,079 * | 6/1987 | Agostini | 369/77.1 |
| 4,733,387 * | 3/1988 | Yoshimura | 369/77.1 |
| 4,969,140 * | 11/1990 | Koiwa et al. | 369/77.1 |
| 4,979,160 | 12/1990 | Araki | 369/75.2 |
| 5,416,763 * | 5/1995 | Ohsaki | 369/77.1 |

FOREIGN PATENT DOCUMENTS

| | | |
|---|---|---|
| 0 200 705 | 12/1986 | (EP) . |
| 2 120 831 | 12/1983 | (GB) . |
| 2 279 490 | 1/1995 | (GB) . |
| 2 280 536 | 2/1995 | (GB) . |
| 60-160061 * | 8/1985 | (JP) . |

* cited by examiner

Primary Examiner—William Klimowicz
Assistant Examiner—Kenneth W. Fields
(74) Attorney, Agent, or Firm—Morgan, Lewis & Bockius LLP

(57) ABSTRACT

A disk carrier mechanism for carrying a disk between an inserting port for inserting the disk into a housing and a reproducing position in which said disk is held on a turntable for reproduction. A pair of carrier levers swinging within a plane parallel to a major surface of the disk are respectively provided with abutting members each abutting onto a peripheral edge section of the disk for enabling holding of the disk therewith in cooperation with each other. The abutting members are respectively provided with inclined surfaces respectively along which the disk can be moved in a direction perpendicular to the major surface of the disk when the carrier leaves swing to approach the peripheral edge sections of the disk or to leave left away from the disk.

13 Claims, 15 Drawing Sheets

DISK CARRIER WITH LEVERS HOLDING AND CARRYING A DISK IN HORIZONTAL DIRECTION

BACKGROUND OF THE INVENTION

1. Technical Field

The present invention relates to a disk carrier mechanism in a disk player, and more particularly to a slot-in type of disk carrier mechanism.

2. Related Arts

As a mechanism for inserting a disk from a slot (insertion port) and carrying it to a reproducing position on a turn table, there is known one disclosed, for instance, in a Japanese Patent Kokai No. 58-189867.

When, in such mechanism, a disk is inserted through a slot into a housing of a disk player, swingable levers each with a pin engaging with a peripheral edge of the disk provided therein are swung, or feed rollers provided so as to hold the disk therebetween from top and down are rotated, and the disk is moved in a horizontal direction toward inside of the housing. When, thereafter the disk reaches a place above the turn table in the housing, a holding member such as a tray or the like for holding the disk is lowered in the vertical direction by using a cam plate or some other vertically moving means thereby to be placed on the turn table.

When, on the other hand, the disk is taken out therefrom, the holding member is raised to release the disk from the turn table, and the disk is carried in the horizontal direction toward the slot by the swinging levers or the like to be sent to outside of the housing.

As described above, the conventional type of carrier mechanism has not only means for moving a disk in the horizontal direction but also means for moving the disk in the vertical direction at a specified position in the housing, and for this reason, the mechanism is complicated in structure and also requires a large number of components, which is undesirable in view of reliability of the mechanism and manufacturing costs.

In the conventional type of carrier mechanism, there have been such problems as that the driving mechanism comprising rollers or the like can not be forcibly driven the disk is stuck inside the player during being carried, when the power source is cut off so that the disk left therein can not be ejected. Further, the carrier driving system may be damaged when the disk is forced to be pulled out therefrom.

For this reason, it has been desired to develop a carrier mechanism which has a simple structure with a small number of components therein and mechanical reliability so that any influence given to the driving system of the device can be evaded even if any load occurs during the loading and the disk can forcibly be ejected even when the disk is left inside the housing.

OBJECT AND SUMMARY OF THE INVENTION

The present invention was conceived in the light of the circumstances as described above, and it is an object of the present invention to provide a disk carrier mechanism in a disk player which can carry a disk in a horizontal direction as well as in a vertical direction with a simple structure, and with which reliability of the mechanism can be improved and costs can be reduced.

In the disk carrier mechanism according to the present invention for carrying a disk between a slot for inserting therein the disk and a reproducing position at which the disk is placed on the turn table to be reproduced, a pair of carrier levers are provided which are swingable within a plane parallel to the major surface of the disk. The carrier levers are respectively provided with abutting members each abutting the peripheral edge section of the disk and enabling holding of the disk in cooperation with each other. Each of the abutting members is so formed as to cause the disk to move in the direction vertical to the major surface thereof with the abutting members closely abutting each other or getting afar from each other by movement of the pair of carrier levers in the direction to which the levers approach the peripheral edge section of the disk or to which the levers leave away therefrom.

With the above configuration, it is possible to move a disk in a horizontal direction as well as in a vertical direction by only swinging movements of the pair of carrier levers.

The disk carrier mechanism according to the present invention has the configuration in which engagement of a rack gear supported by a driving cam plate which can freely reciprocate in the lever drive means for carrying a disk by causing the carrier levers to swing with a rotating gear is temporarily disengaged, when any load is generated in the opposite direction toward the rotating gear in the driving side to be engaged, therefrom by distortion of a supporting member to enable movement of a position of engagement thereof with the rotating gear because the rack gear is supported by the supporting member easy to be distorted in one direction in the reciprocation than that in the opposite direction.

With the above configuration, it is possible to prevent any influence due to the load given to another devices when a disk stops its movement with some trouble during the movement of the disk (e.g.during loading) or when the disk is forcefully pulled out therefrom, or it is possible to push a driving cam plate into the housing with an operation from the outside when the disk left inside the housing is taken out (is forced to be ejected) while the power source is being cut off.

DETAILED DESCRIPTION OF THE EMBODIMENTS

Description is made hereinafter for embodiments of the disk carrier mechanism according to the present invention with reference to the related drawings.

Figure 1:
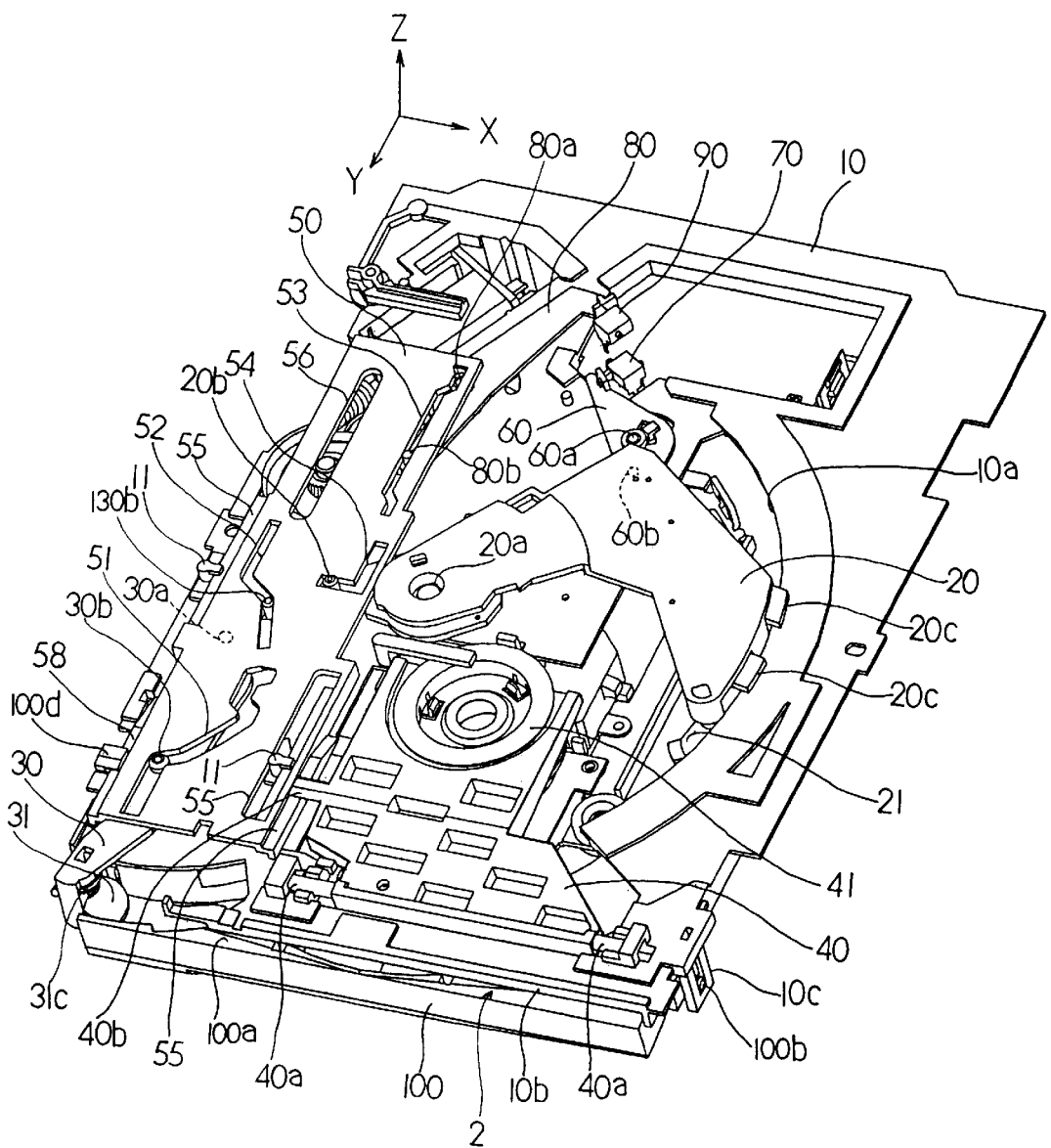
FIG. 1 is a perspective view showing appearance of a disk player according to the present invention.

FIG. 1 is a perspective view showing appearance of a disk player employing the carrier mechanism according to the present invention while the housing has been removed. Provided in a main chassis 10 are, as shown in the figure, disk carrying means 20, 21, 30, 31 each for carrying a disk inserted through a slot 2 into the housing (not shown); clamping means 40, 41 each for clamping the disk loaded on the turn table by the disk carrying means; driving means, namely lever drive means 50, 110, 111, 112, 113 (Refer to FIG. 3) each for driving the disk carrying means and the clamping means or the like; detecting means 60, 70, 80, 90 each for detecting an actuating timing of the lever drive means; and a double insertion preventing means 100 or the like for preventing the double insertion of disks.

Figure 3:
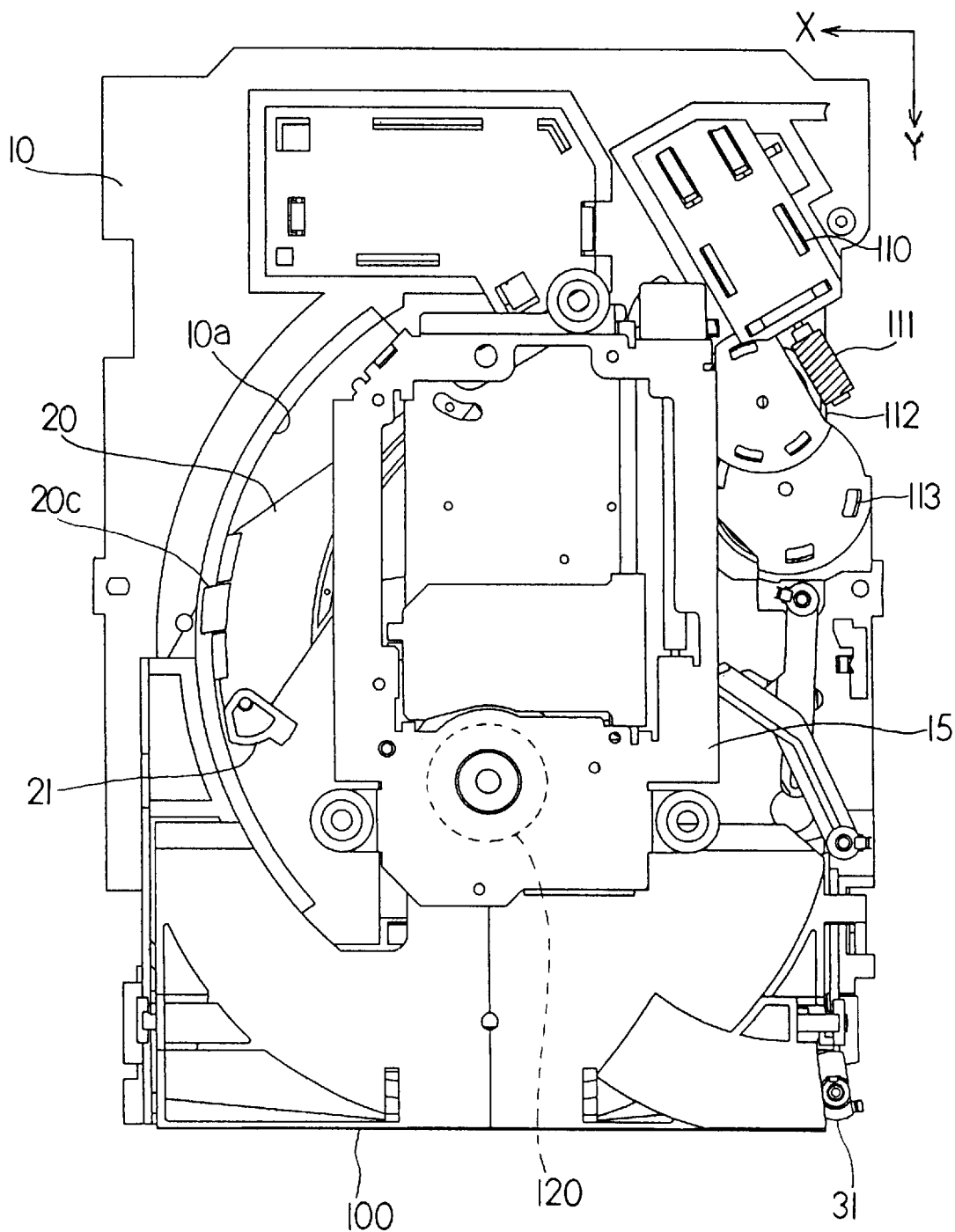
FIG. 3 is a bottom view of the disk player according to the present invention.
Figure 6:
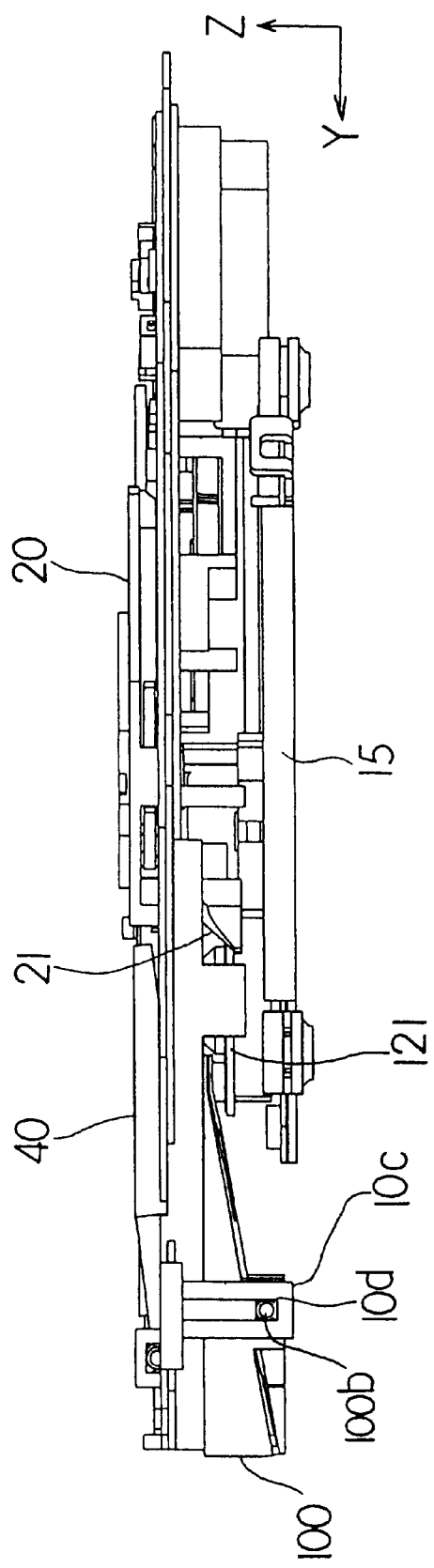
FIG. 6 is a right side view of the disk player according to the present invention.

As shown in the bottom view in FIG. 3 as well as in the right side view in FIG. 6, reproducing means including a spindle motor 120 for reproducing information from the disk and a turn table 121 is provided in a lower chassis 15.

Those various types of mechanisms described above will be explained in more detail.

At first, description is made for disk carrying means for carrying a disk having a diameter of 12 cm inserted through the slot 2 up to a reproducing position and carrying it up to the slot after the reproduction is finished.

Figure 2:
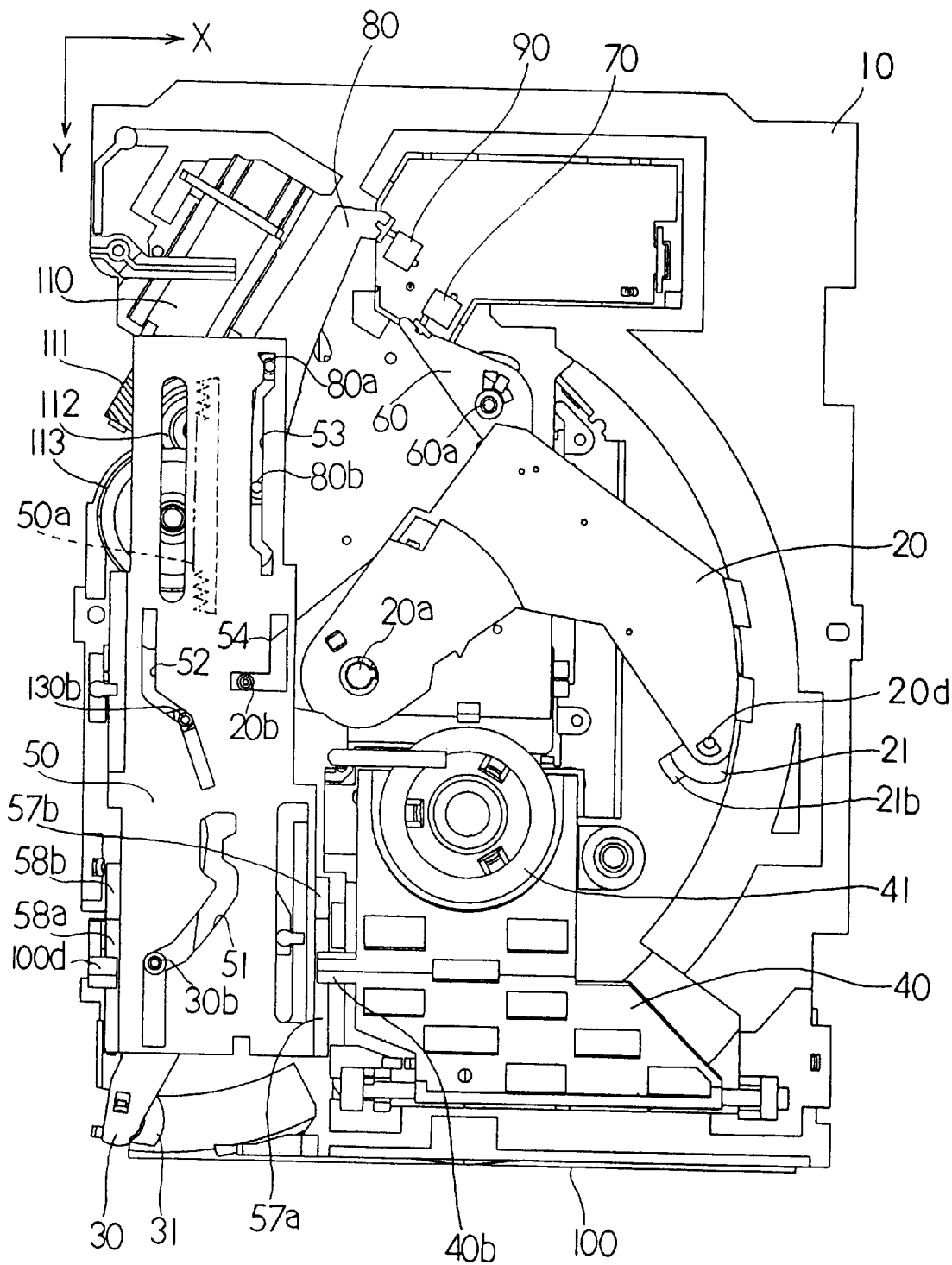
FIG. 2 is a plan view of the disk player according to the present invention.

As shown in FIG. 1 to FIG. 3, a supporting shaft 20a is provided in a substantially central section of the main chassis 10, and an inverted L-shaped first carrier lever 20 is provided which is swingable about this supporting shaft 20a. Provided in a free edge of this first carrier lever 20 are two projecting pieces 20c projecting in the horizontal direction on the top side of the main chassis 10 and one projecting piece 20c (Refer to FIG. 3) projecting in the horizontal direction on the bottom side thereof so as to hold an arch-shaped opening edge 10a of the main chassis therebetween from upward and downward of the opening edge so that the first carrier lever 20 is swung without unwanted looseness thereof in the vertical direction. A pin 20d is provided at the free edge of the lever 20 so as to extend downward. The pin 20d is provided with a tapered member 21 as an abutting member so that it constitutes a portion having a substantially truncated conical form, and the peripheral edge of the disk is engaged with the tapered surface 21a when the disk is inserted through the slot 2 into the housing. It should be noted that an overhanging piece 21b protruding in the horizontal direction for restricting a downward movement of the disk is formed in the bottom edge of the tapered member 21, while an upper-side restricting piece 21c for restricting an upward movement of the disk is formed in the upper edge thereof (Refer to FIG. 7). An engaging pin 20b is upwardly mounted on an arm section extended to the opposite side to the first carrier lever 20 with respect to the supporting shaft 20a thereof, and is engaged with a cam groove 54 of a driving cam plate 50 which will be described hereinafter.

On the other hand, a second carrier lever 30 is provided at the left side of the main chassis 10 so that it can freely swing about a supporting shaft 30a, as seen from FIG. 1. Formed in a pin provided at the free edge of the second carrier lever 30 so as to extend downward is a tapered member 31 functioning as an abutting member, which has a portion of a substantially truncated conical form. The peripheral edge of the disk is engaged with the tapered surface 31a when the disk is inserted through the slot 2 into the housing. It should be noted that an upper-side restricting piece 31c for restricting an upward movement of the disk is formed above the tapered surface 31a (Refer to FIG. 1 and FIG. 7).

An engaging pin 30b is so mounted as to extend upward at the substantially intermediate area of the lever 30 and engages with a cam groove 51 of the driving cam plate 50 which will be mentioned hereinafter.

The peripheral edge of the disk is held by the upper surfaces of the tapered members 21 and 31 provided at the free ends of both of the carrier levers 20 and 30, the disk is transferred in the horizontal direction by rotating both of the carrier levers 20 and 30 in a counterclockwise direction, and the disk is lowered along the tapered face 21a and 31a of the tapered member 21 and 31 by swinging the carrier levers 20 and 30 each at a specified carrying-in position (centering position) in a direction to which the levers are left from the disk and the disk is positioned at the reproducing position on the turn table.

On the other hand, the disk at the reproducing position is held upward when both of the carrier levers 20 and 30 are swung in a direction to which the levers approach the disk, and further the disk is taken out in the horizontal direction by swinging motions of the levers 20 and 30 in the clockwise direction in the figures.

A disk carrier mechanism for carrying a disk in a horizontal direction as well as in a vertical (upward and downward) direction is constituted by the first carrier lever 20, tapered member 21, second carrier lever 30 and tapered member 31.

A clamping means for clamping the disk held on the turn table will be explained herein below. As shown in FIG. 1 and FIG. 2, a swinging shaft 40a is supported in the front side of the main chassis 10 and a damper arm 40 is so provided that it can freely swing in the vertical direction. A damper 41 for pressing a disk downward to clamp it is rotatably attached to a place adjacent to the free end of the arm 40. Further, an engaging piece 40b protruding in the horizontal direction and for engaging a cam section 57 formed in the driving cam plate 50 described herein below from the upper side is provided in the left side section of the damper arm 40. It should be noted that the damper arm 40 is energized by urging means (not shown in the figure) provided in the swinging shaft 40a section so that the clamper arm 40 is always urged to swing downward, and the engagement between the engaging piece 40b and the top surface of the cam section 57 is maintained by this urging force, so that the damper arm 40 is swung in the vertical direction.

The clamping means for clamping a disk onto the turn table is constituted by the damper arm 40, engaging piece 40b, cam section 57, and the damper 41.

A lever drive means for driving the disk carrying means as well as the clamping means or the like will be explained herein below. As shown in FIG. 1 to FIG. 3, the driving cam plate 50 elongated in the Y-axis is provided above the main chassis 10 at the left side thereof and above the second carrier lever 30, etc. This cam plate 50 is supported at a sliding surface 55 thereof by a supporting piece 11 fixed to the main chassis 10, so that the cam plate 50 can freely reciprocate in the Y-axis. A rack gear 50a is formed in the bottom face of the cam plate 50, and the cam plate 50 can reciprocate in the Y-axial direction because of the rotation of a driving motor 110 through a double-geared gear wheel 113, a pinion 112, and a worm 111.

In the driving cam plate 50, four cams 51, 52, 53 and 54 are formed with which an engaging pin 30b of the second carrier lever 30, an engaging pin 130b of an auxiliary lever 130 for discharging a disk (described later), an engaging pin 80b of a switching lever 80 (described later), and an engaging pin 20b of the first carrier lever 20 are engaged respectively. It should be noted that an elongated bore 56 formed in the rear and left side of the cam plate 50 allows insertion of the rotary shaft of the gear wheel 113 and the cam shaft can be used also as a guide pin for guiding the cam plate 50 only in the Y-axial direction. A female screw bore may be provided in the upper edge of the rotary shaft to attach thereto a collar bolt or the like and to restrict an upward movement of the cam plate 50.

A lever drive means for driving the disk carrying or transferring means and clamping means, etc. is constituted by the driving cam plate 50, gear wheel 113, pinion 112, worm 111, and driving motor 110, etc.

A description is hereinbelow made with respect to detecting means 80 and 90 for detecting both ends of a stroke of the driving cam plate 50 and detecting means 60 and 70 for detecting a home position of the first carrier lever 20. A first switch lever 80 is provided at a rear left side position on the main chassis 10 so that it can freely swing around the supporting shaft 80a. An engaging pin 80b is so mounted as to stand upward at one end of the switch lever 80, and is engaged with a cam groove 53 of the driving cam plate 50. The other end of the switch lever 80 is engageable with a first switch 90. The other end of the switch lever 80 is disengaged from the first switch 90 which then takes an OFF-state (high level) at both utmost ends of the moving stroke of the driving cam plate 50 (namely, an eject position and a clamp and reproducing position) and is engaged with the switch 90 within the stroke area so that the switch 90 takes an ON-state (low level).

A second switch lever 60 is provided at a rear position within the housing on main chassis 10 so that it can swing around a supporting shaft 60a. An engaging pin 60b is provided at one end of the second switch lever 60 so as to extend upward, thereby to be engageable with an engaging part (not shown in the figure) formed in the lower surface of the first carrier lever 20. The other end of the second switch lever 60 is engageable with the second switch 70. As long as the first carrier lever 20 rotates in the clockwise direction (forward movement) from the home position, the second switch lever 60 rotates in the counterclockwise direction and is disengaged from the second switch 70 which then takes an OFF-state (high level). When the first carrier lever 20 is caused to rotate for a specified distance from its home position in the counterclockwise direction, the second switch lever 60 rotates in the clockwise direction and is engaged with the second switch 70 which then takes an ON-state (low level). This engaging state is maintained until the disk reaches a clamped state i.e. the reproducing position.

The detecting means for detecting both ends of the stroke region of the driving cam plate 50 and for detecting an angular position of the first carrier lever 20 comprises the first switch lever 80, first switch 90, second switch lever 60 and the second switch 70.

Figure 4:
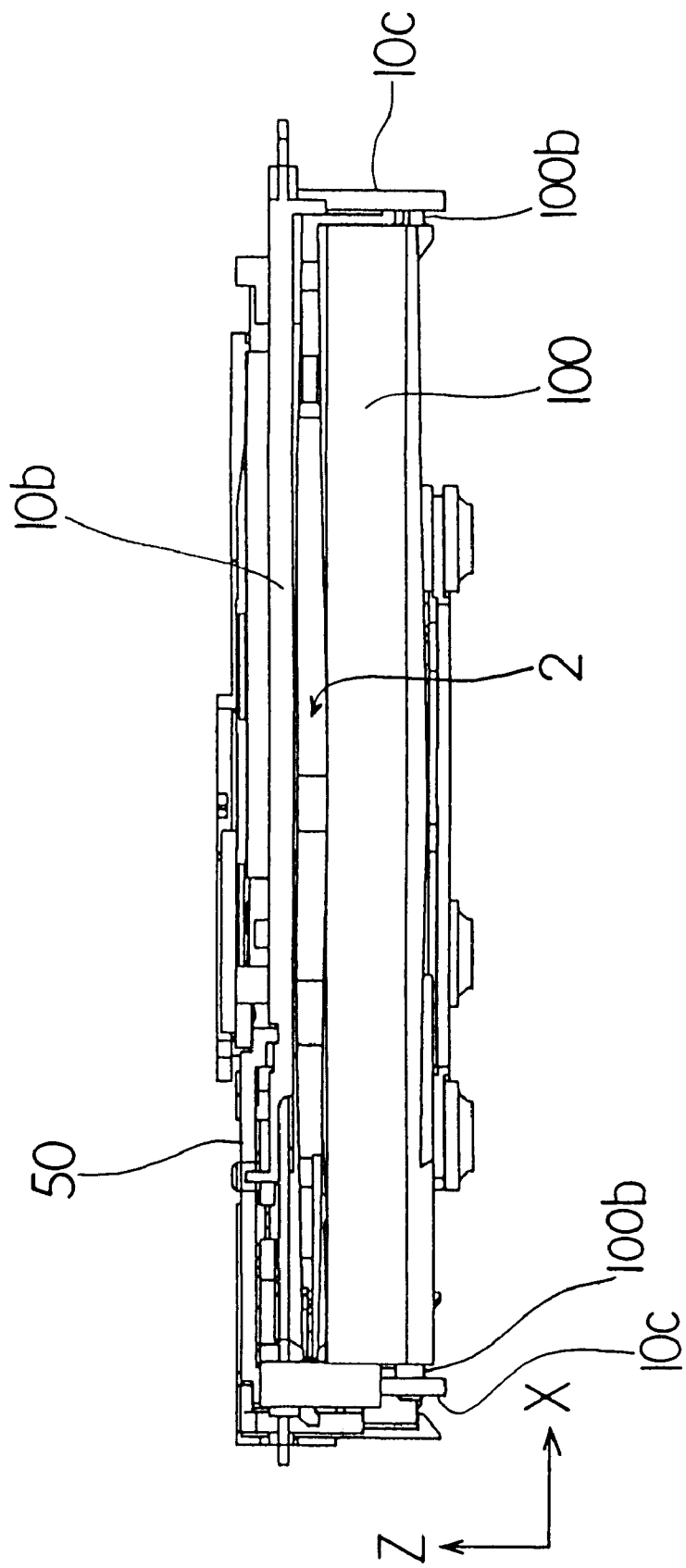
FIG. 4 is a front view of the disk player according to the present invention.
Figure 5:
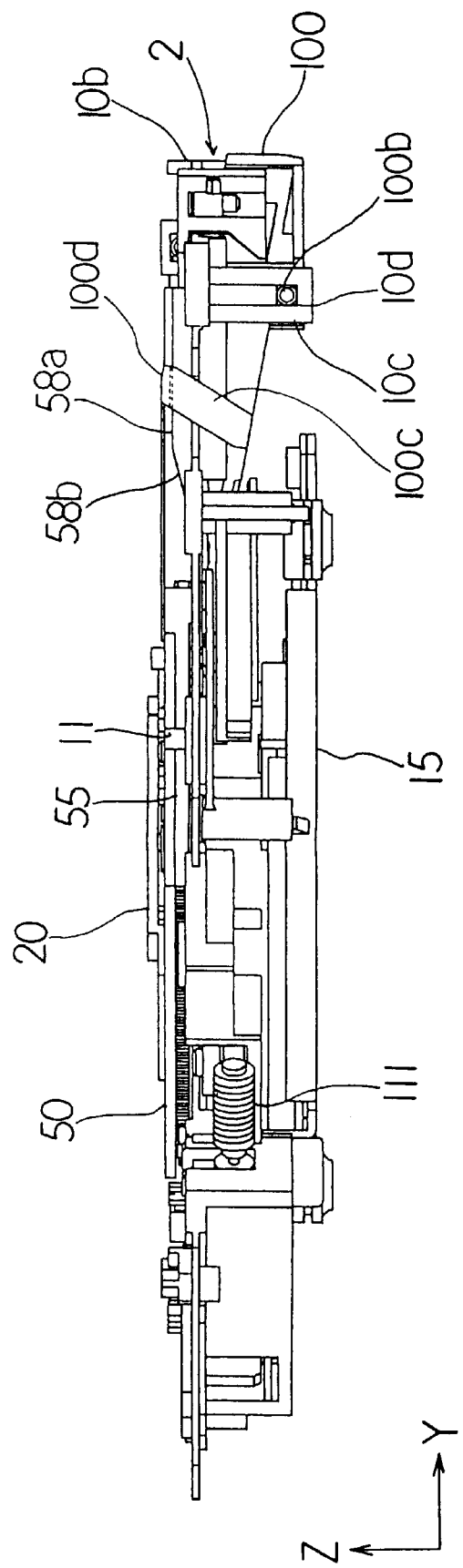
FIG. 5 is a left side view of the disk player according to the present invention.

A description is made with respect to a guide shutter 100 which constitutes a portion of a slot when a disk is inserted and closes the slot after the disk is inserted into the housing so as to prevent the double insertion of the disk. FIG. 1, FIG. 4, FIG. 5, and FIG. 6 show an appearance of the guide shutter 100 respectively. It should be noted that FIG. 4 shows a front view of the device, FIG. 5 shows a left side view thereof, and FIG. 6 shows a right side view thereof.

As shown in FIG. 5 and FIG. 6, a pair of hanging pieces 10c each hanging down are provided in both sides in the front area of the main chassis 10, and bearing holes 10d are formed in the end portions of the hanging pieces, respectively.

On the other hand, as shown in FIGS. 1 and 4–6, the guide shutter 100 is formed by a front face section forming a vertical face which is substantially flat and is elongated in a direction of both sides in the front face of the housing, and by a bottom surface section extending from the bottom of the front face section extending rearward and upward. Supporting shafts 100b are provided at both side edges of the guide shutter 100 respectively, and the supporting shafts 100b is inserted into and engaged with the shaft hole 10b of the hanging piece 10c respectively, so that the guide shutter 100 can swing in the vertical direction.

As shown in FIG. 5, an arm section 100c is so provided in the left side of the guide shutter 100 as to extend upward, and an engaging piece 100d bent in the horizontal direction is formed at a tip of the arm section 100c to be engaged with a cam section 58 formed on the driving cam plate 50. In this connection, FIG. 1 should be referred to.

When, accordingly, when the driving cam plate 50 moves frontward i.e. in the Y-axial direction, the engaging piece 100d relatively moves from a flat surface 58a of the cam section 58 to an inclined surface 58b, and the guide shutter 100 swings upward so as to close the slot 2. On the other hand, when the driving cam plate 50 moves rearward, the guide shutter 100 swings downward. In this state, the slot 2 for inserting thereinto a disk is actually defined by an upper edge section 100a of the front face of the guide shutter 100 and the front edge section 10b of the main chassis 10.

It should be noted that known components are applicable for a spindle motor 120, a turn table 121, and a pickup (not shown in the figure) or the like each provided on the lower chassis 15, so that description thereof is omitted herein.

Figure 8A:
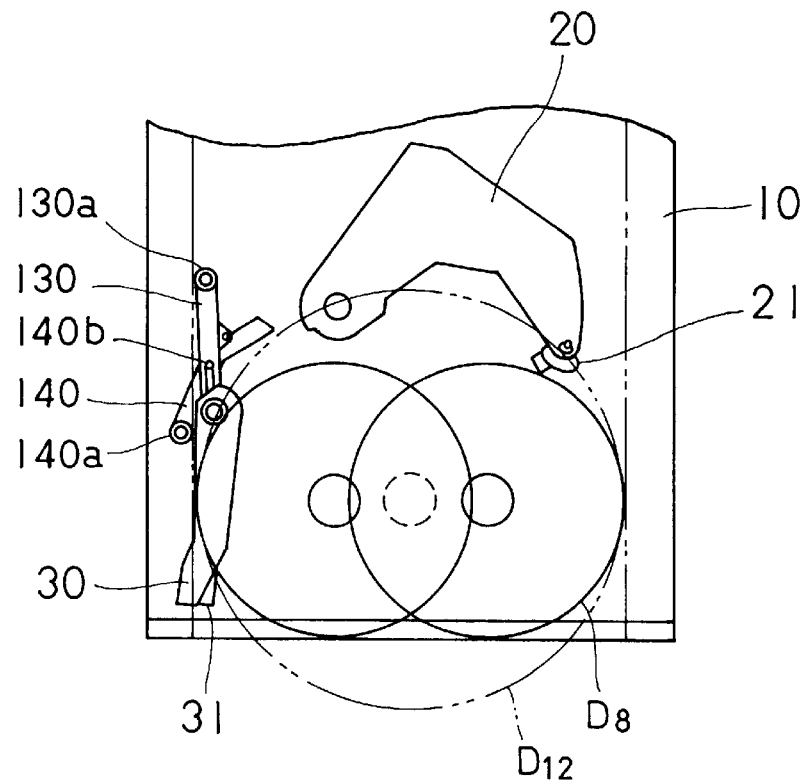
FIG. 8A and FIG. 8B are plan views each showing reconfiguration of a disk ejecting means member of a disk carrier mechanism of the present invention.
Figure 8B:
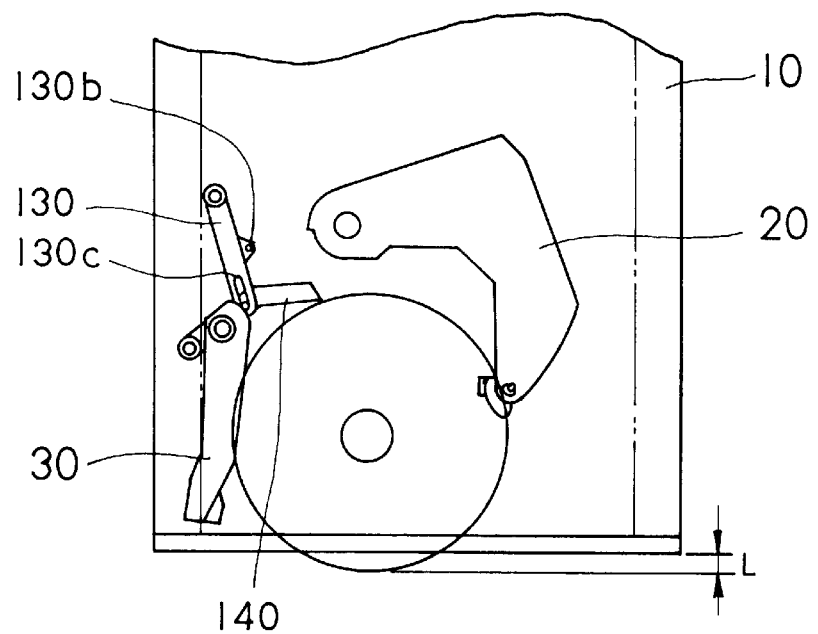
Figure 9:
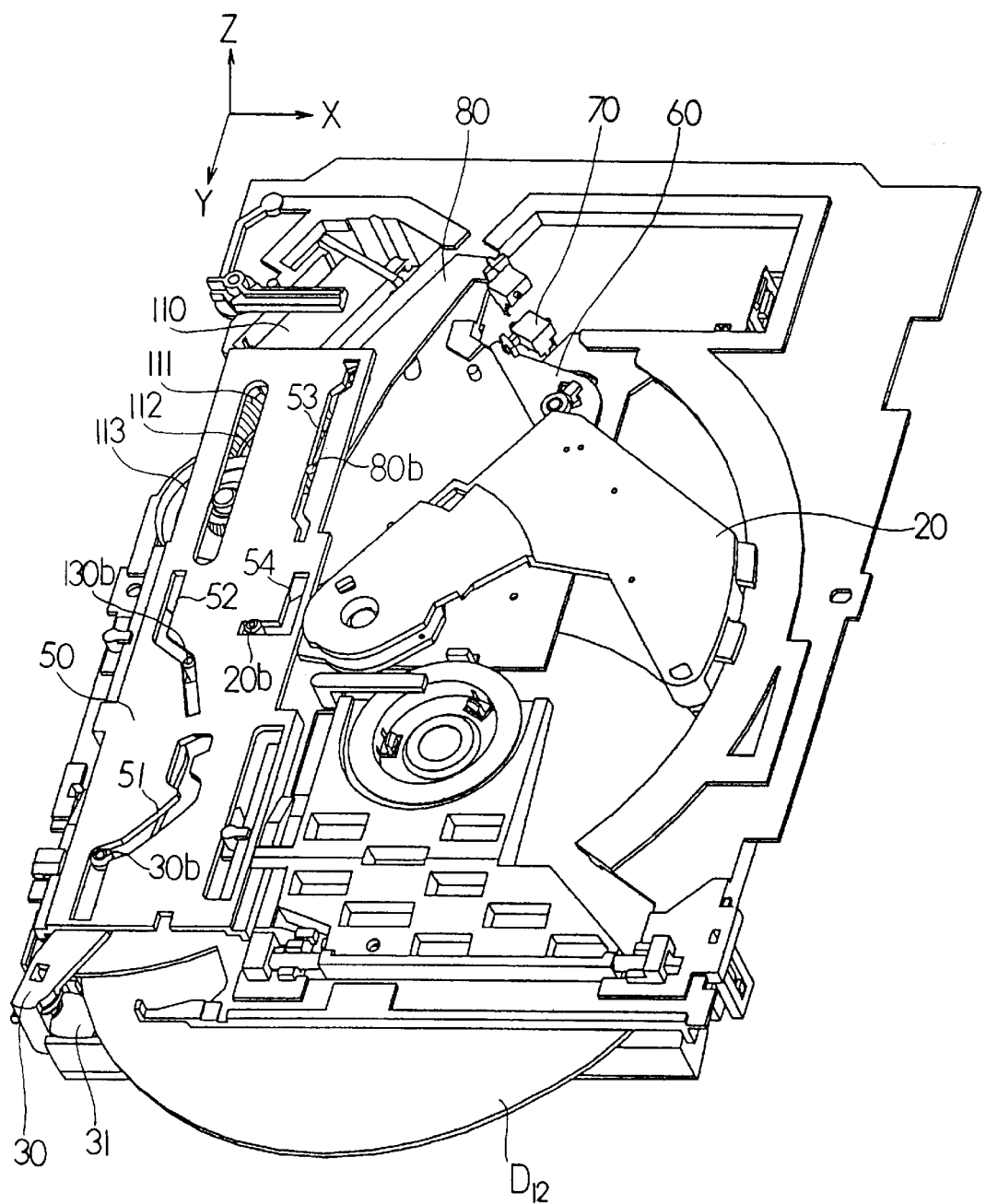
FIG. 9 is a perspective view for explaining operations of the disk player according to the present invention.

A discharging means is provided which functions discharging a disk (D8) having a diameter of 8 cm from the housing when it is incorrectly inserted into the disk player. FIGS. 8A and 8B diagrammatically show the discharging mechanism, while the driving cam plate 50, clamping means 40, 41, and lever drive means, etc. have been removed. As shown in the figure, a discharging lever 140 for pushing out the 8-cm-diameter disk and a auxiliary lever 130 for conveying driving force to the discharging lever 140 are provided in the area in the left side above the main chassis 10 and in the lower side of the driving cam plate 50 so that they can swing freely. The discharging lever 140 can freely be swung around a supporting shaft 140a and the free end thereof is engaged with the peripheral edge of the disk. An engaging pin 140b is mounted on a substantially central part of the lever 140 to extend upward.

On the other hand, the auxiliary lever 130 is swingable around the supporting shaft 130a. An elongated bore 130c is formed at a free end of lever 130. An engaging pin 140b of the discharging lever 140 is inserted into and engaged with the elongated bore 130c so that both of the levers 130 and 140 are interlinked together. An engaging pin 130b for engaging with the cam groove 52 of the driving cam plate 50 is provided at the side of the substantially central portion of the auxiliary lever 130.

When, accordingly, the driving cam plate 50 moves from the home position rearwardly, the auxiliary lever 130 rotates in the counterclockwise direction while the discharging lever 140 rotates in the clockwise direction. In a case where the inserted disk is positioned in a place a little to the left side of the device, the free end of the discharging lever 140 contacts the peripheral edge of the disk to push out the disk toward the outside i.e. frontwards. (Refer to FIG. 8B).

When, on the other hand, the inserted 8-cm-diameter disk is positioned in a place slightly righthand side of the device, the first discharging lever 20 rotates in a clockwise direction, and the tapered member 21 thereof is engaged with the peripheral edge of the disk to push out the disk toward the outside i.e. frontwards.

The above-mentioned discharging operations are initiated by a user to push an eject button provided on a front panel (not shown in the figure). When, with the pushing of the eject button, when the driving motor 110 rotates and the driving cam plate 50 is moved for a specified distance from the home position toward the rear side, the discharging lever 140 and the first carrier lever 20 are rotated through a specified angle in a clockwise direction respectively, a portion of the disk (a dimension indicated by L in FIG. 8B) is pushed out of the housing even in a case where the disk is positioned slightly deviated toward either side, so that the user can catch a portion appearing out of the housing thereby to take the disk out thereof.

It should be noted that, even if the 8-cm-diameter disk is completely inserted into the slot 2, it does not make the first carrier lever 20 rotate in the counterclockwise direction, and accordingly, the second switch 70 is not actuated and loading of the disk is not started. In a case where a 12-cm-diameter disk is inserted, however, the discharging lever 140 and the auxiliary lever 130 are escaped toward the left side because of action of the cam groove 52 of the driving cam plate 50, whereby insertion of the disk is not prevented.

Various operations of the disk player according to the subject invention will explained hereinbelow while referring to FIG. 9 to FIG. 12.

It is first assumed that each of operating members of the device is positioned at the home position. When, at first, the user inserts a 12-cm-diameter disk (D12) thereinto the peripheral edge of the disk at the rear right side portion thereof is engaged with the tapered member 21 of the first carrier lever 20, which makes this carrier lever 20 rotatably move slightly in the counterclockwise direction. Then, an engaging pin (not shown in the figure) formed on the bottom face of the first carrier lever 20 is engaged with an engaging pin 60b to rotatably move the second switch lever 60 in the clockwise direction, thereby causing to turn on the second switch 70. In response to the turn-on, i.e. trigger action of the switch, the driving motor 110 commences its rotation, so that the driving cam plate 50 moves frontward in the Y-axial direction through an array of gears 111, 112, and 113.

Figure 7:
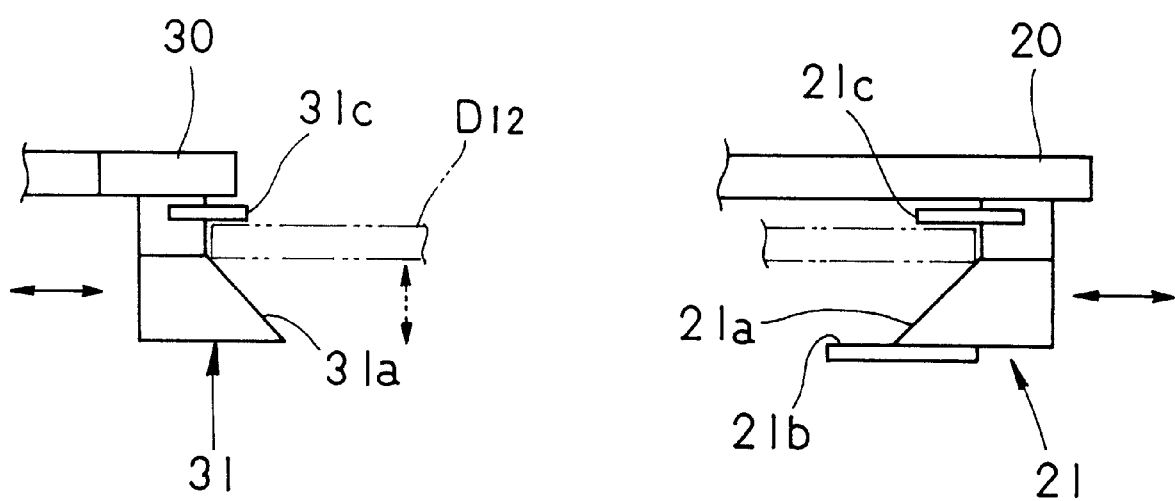
FIG. 7 is a side view showing a tapered member of a disk carrier mechanism of the present invention.

The frontward movement of the driving cam plate 50 makes the second carrier lever 30 rotate in the counterclockwise direction, and the tapered member 31 thereof is engaged with the peripheral edge of the disk, whereby the disk is held by tapered faces of both the tapered members 21 and 31. It should be noted that, in this state, as shown in FIG. 7, the disk is slightly held up by the tapered members and the top surface of the periphery of the disk contacts the upper side restricting pieces 21c and 31c, so that the disk is prevented from the further upward movement. It should be noted that a form by tapered surfaces in the tapered members 21 and 31 is not restricted to a form by conical side faces, and the form may be obtained by inclined faces each inclining in a direction opposite to each other toward the moving direction of the tapered members 21 and 31.

Figure 10:
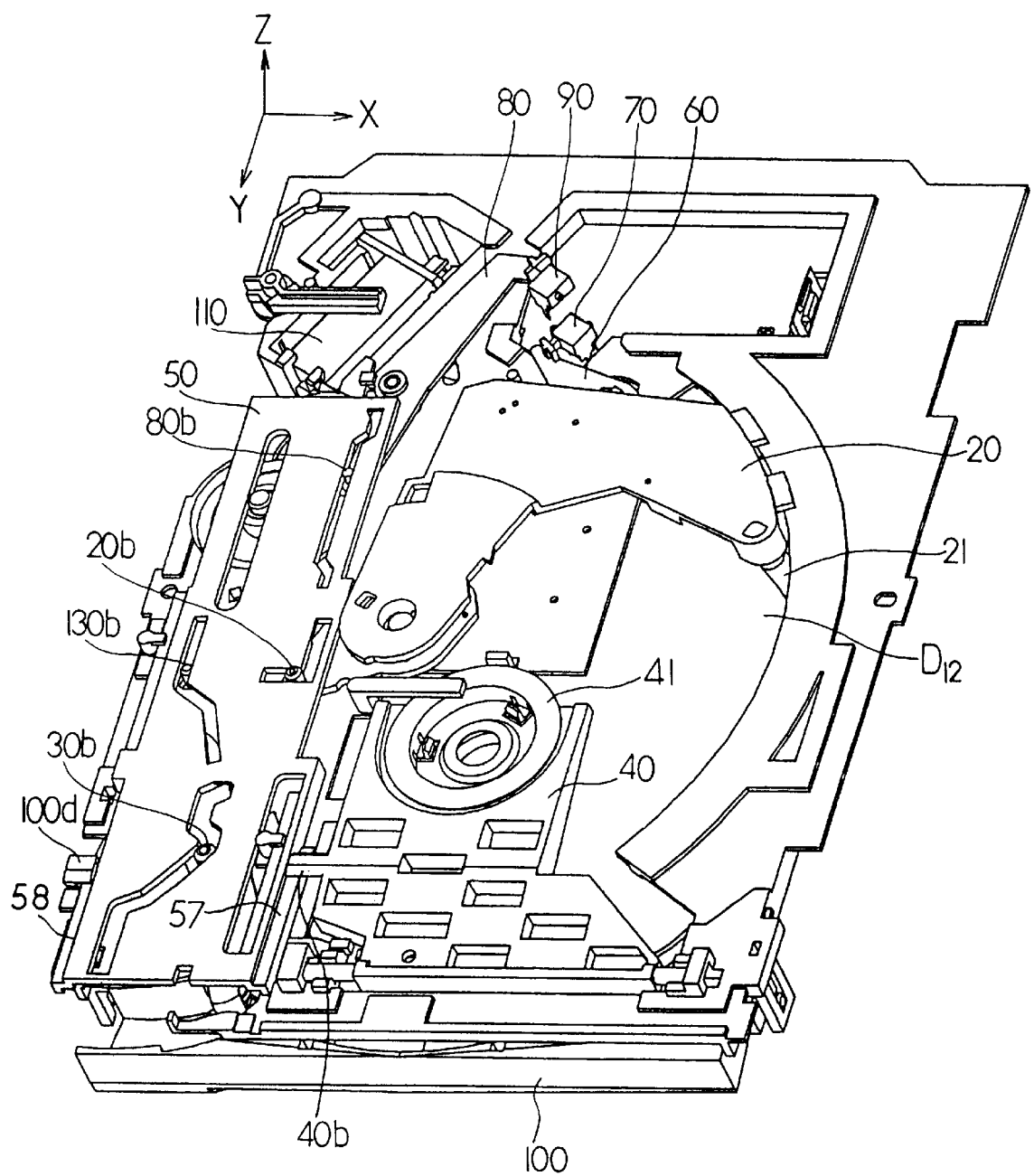
FIG. 10 is a perspective view for explaining operations of the disk player according to the present invention.
Figure 11:
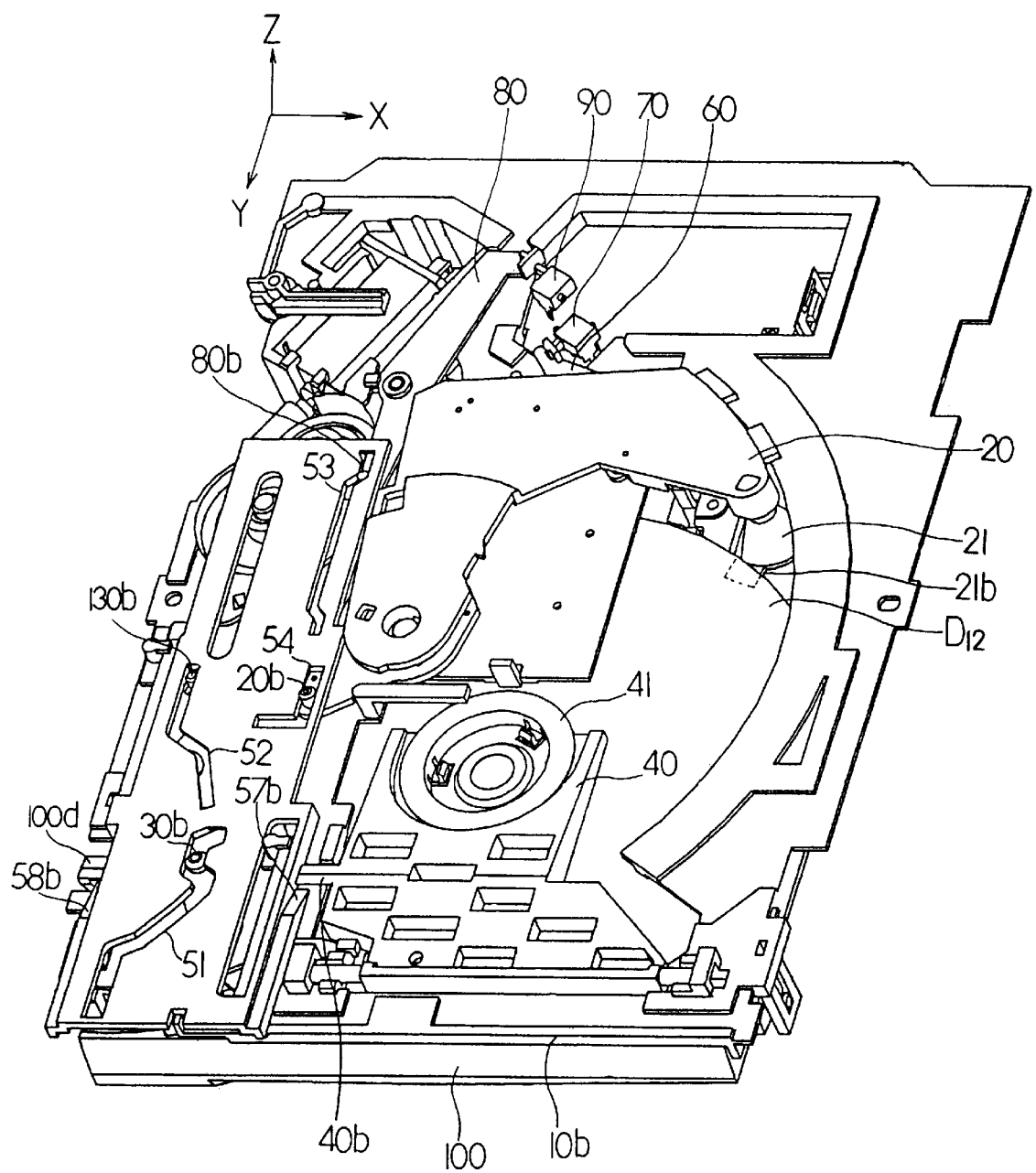
FIG. 11 is a perspective view for explaining operations of the disk player according to the present invention.

In the above holding state, the first carrier lever 20 and the second carrier lever 30 rotate in the counterclockwise direction as the driving cam plate 50 moves forward, whereby the disk is carried to the centering position as shown in FIG. 10. This centering position is a position obtained when the disk reaches a place above the turn table 121. In the carrying movement, the discharging lever 140 and the auxiliary lever 130 are moved away to the escaping positions thereof, respectively.

When, furthermore, the driving cam plate 50 is moved forward, both the carrier levers 30, 20 are moved slightly by actions of the cam grooves 51, 54 in a direction in which each of the levers is disengaged from the peripheral edge of the disk respectively. In this instance, the disk moves downward along the tapered faces 21a and 31a thereby to be placed on the turn table 121. At the same time, the engaging piece 40b of the damper arm 40 goes down along an inclined face 57b of the cam section 57, the damper arm 40 rotates and moves downward because of an urging force of the urging means, and the damper 41 provided at the free end of the damper arm clamps the disk downward.

The engaging piece 100d of the guide shutter 100 goes down along an inclined face 58b of the cam section 58, the guide shutter 100 rotates and moves upward with the urging force of the urging means, the top edge 100a of the front section of the guide shutter abuts onto the lower surface of the front edge section 10b of the main chassis 10 to close the slot 2. Both the carrier levers 30 and 20 are further left from the disk, so that a clearance required for the rotation of the disk is established (Refer to FIG. 11). In this state, an overhanging piece 21b of the tapered member 21 is positioned below the disk (Refer to FIG. 11).

In concurrence with the above-mentioned operations, the first switch lever 80 is swung in the counterclockwise direction because of the action of the cam groove 53 and the first switch 90 is turned off, thereby to de-energize the driving motor 110. With those operations, the loading of the disk is completed.

When, on the other hand, the user wants to eject the disk from the housing, the user presses down the eject button provided on the front panel of the housing. With this operation, the driving motor 110 rotates in the opposite direction to that when the disk is carried in, and the driving cam plate 50 is moved rearward. Then, the damper arm 40 rotates and moves upward to release the clamping from the disk with the actions of the cam sections 57 and 58, and the guide shutter 100 rotates and moves downward to define the slot 2. At the same time, both the carrier levers 20 and 30 are rotated and moved in a direction to which the levers approach the disk with the actions of the cam grooves 54 and 51, and the disk is disengaged from the turn table while it is held by the wedges of the tapered surfaces 21a and 31a in the tapered members 21 and 31 to be moved upward. When the driving cam plate 50 is further moved rearward, both the carrier levers 20 and 30 are rotated in the clockwise direction while holding the disk and the disk is carried toward the slot 2.

Figure 12:
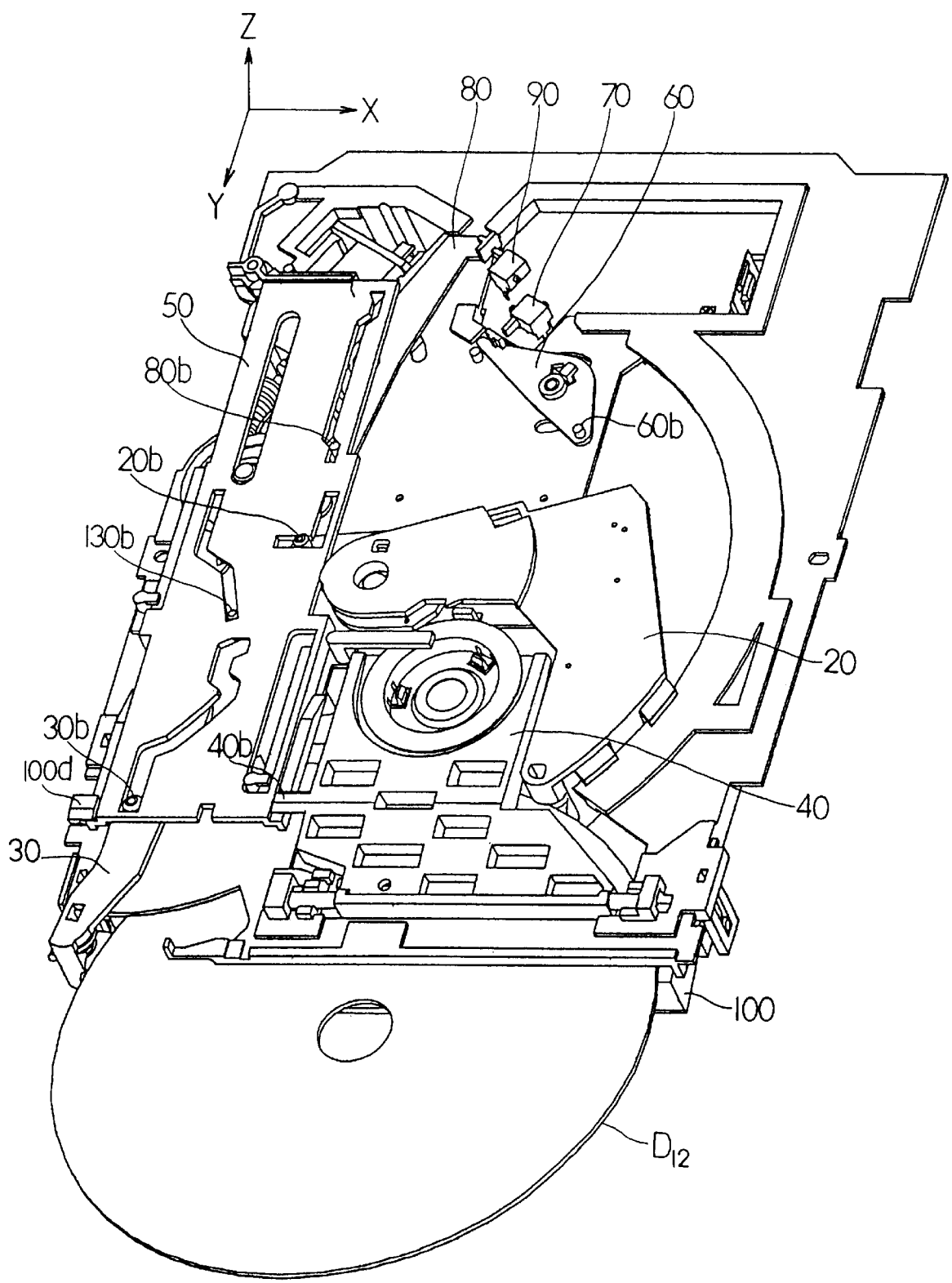
FIG. 12 is a perspective view for explaining operations of the disk player according to the present invention.

When the second carrier lever 30 returns to a position at which the disk carrying motion has started, this second carrier lever 30 leaves the disk, the second switch 70 is cut off, and only the first carrier lever 20 continuously rotates and moves to carry the disk to the eject position as shown in FIG. 12.

At the same time when the disk is ejected, the first switch lever 80 is rotated and moved in the counterclockwise direction because of the action of the cam groove 53 and the first switch 90 is actuated thereby to rotate the driving motor 110 in the reverse direction. With those operations, the driving cam plate 50 starts to move forward, and the first carrier lever 20 is rotated and moved in the counterclockwise direction thereby to move rearward.

With the rotation and movement of the first carrier lever 20, the second switch lever 60 is rotated in the clockwise direction so that the second switch 70 is turned on whereby the driving motor 110 is again rotated in reverse, the second switch is turned off, the driving motor 110 is stopped at the home position, and the eject operation is completed.

Figure 14:
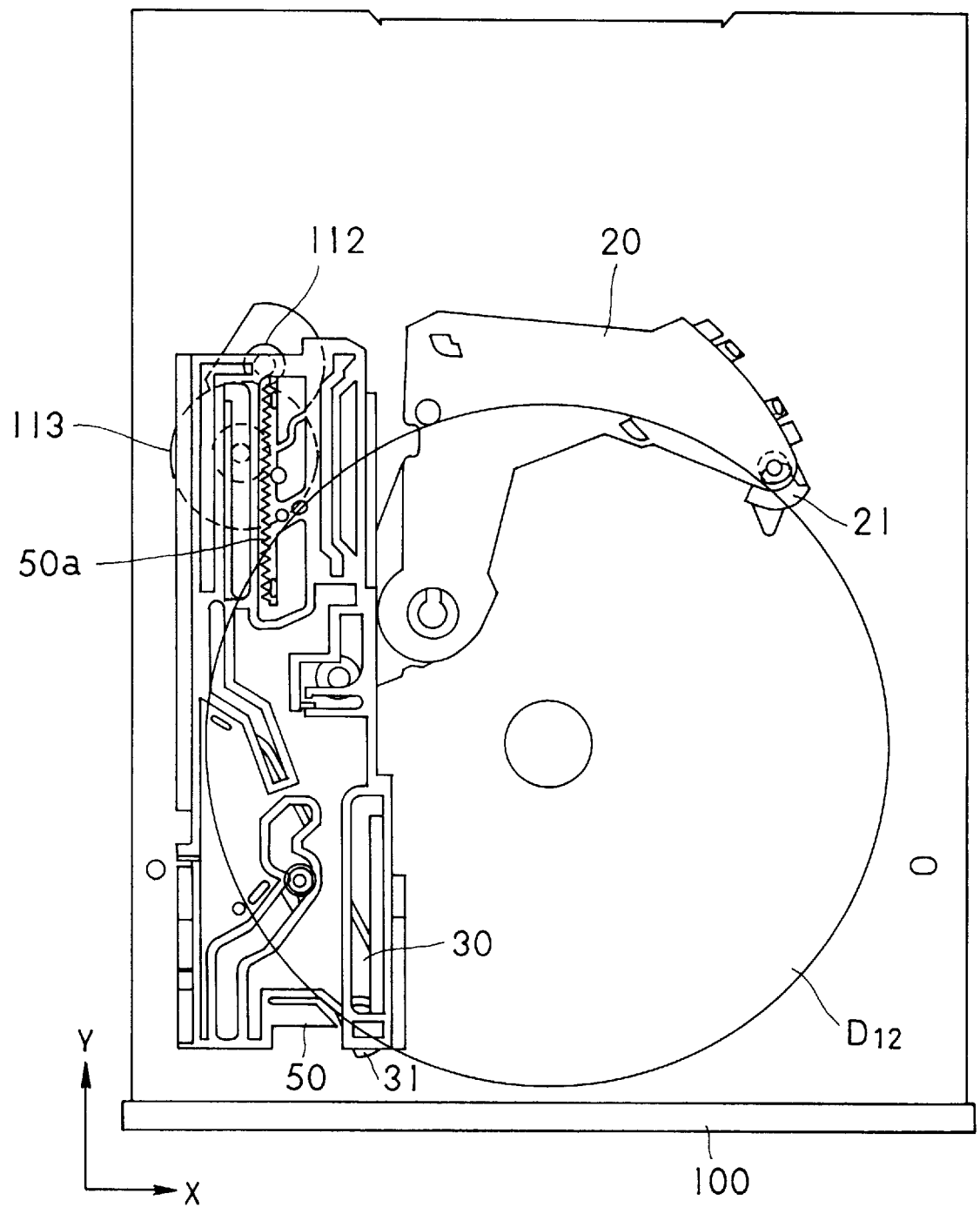
FIG. 14 is a view for illustrating operations of the lever drive means according to the present invention, which is a plan view showing a state in which the disk has been carried to a position right above the turn table.
Figure 15:
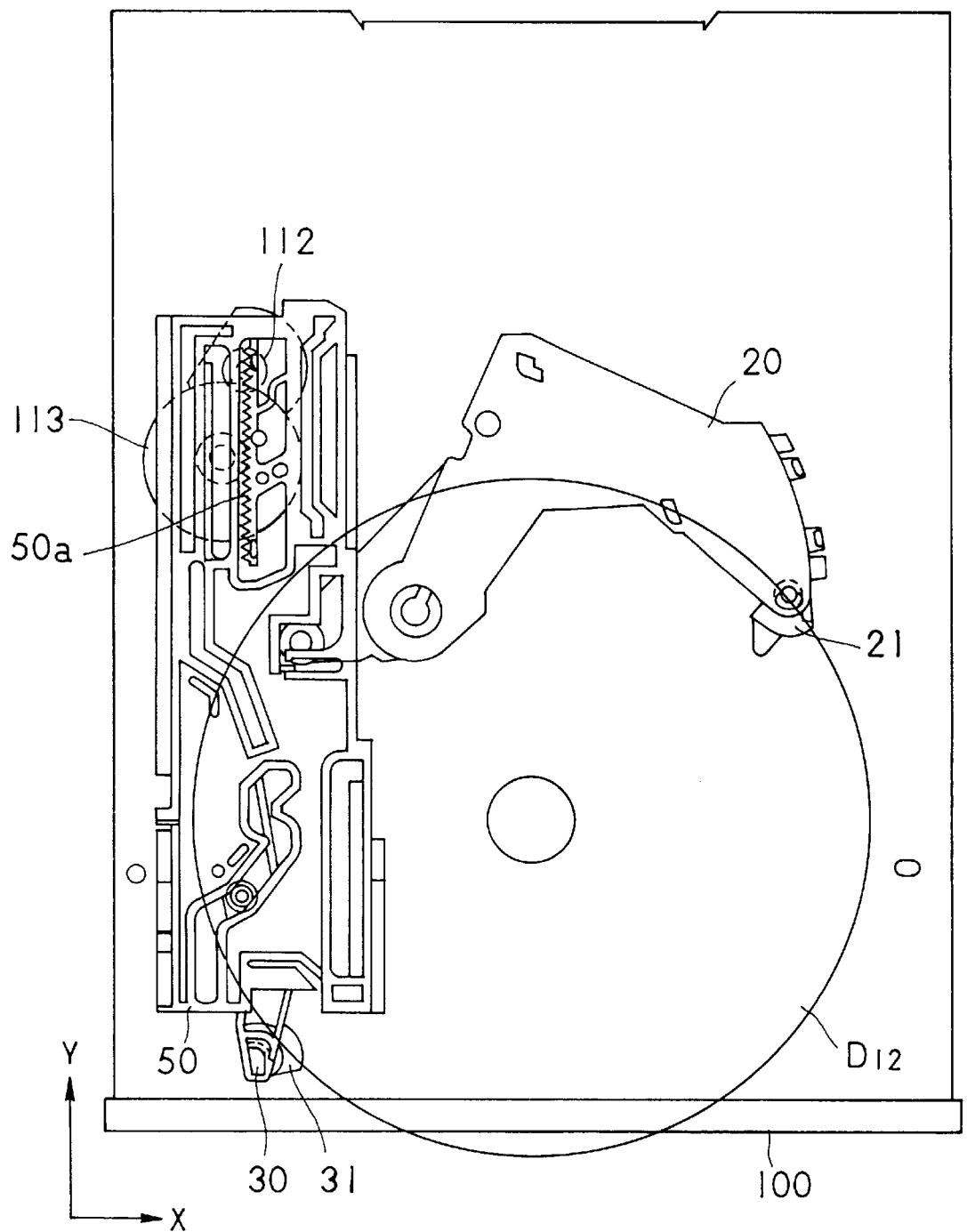
FIG. 15 is a view for illustrating operations of the lever drive means according to the present invention, which is a plan view showing a state in which a portion of the disk has been projected from the slot by a forcible operation for ejection.

A description is made hereinafter with respect to a modified example of the lever drive means. As shown in FIG. 13 to FIG. 15, the driving cam plate 50 elongated in the Y-axis is provided above the main chassis 10 at the left side thereof and above the second carrier lever 30, etc. This cam plate 50 is supported at a sliding surface 55 thereof by a supporting piece 11 fixed to the main chassis 10, so that the cam plate 50 can freely reciprocate in the Y-axis. A rack gear 50a is formed in the bottom face of the cam plate 50, and the cam plate 50 can reciprocate in the Y-axial direction because of the rotation of a driving motor 110 through the double-geared gear wheel 113, pinion 112, and worm 111 (Refer to FIG. 1).

Figure 13A:
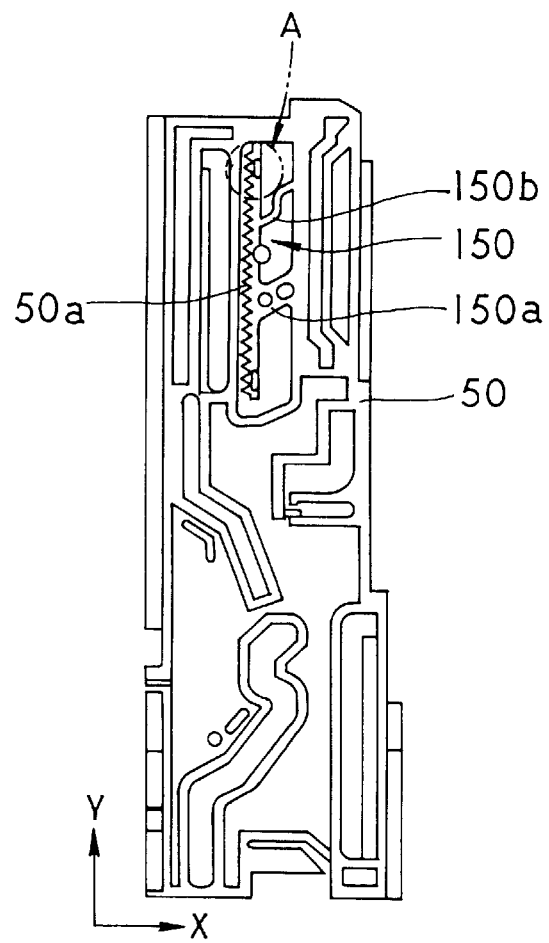
FIG. 13A is a plan view showing only a cam plate of the lever drive means.

As shown in FIG. 13A, the rack gear 50a is supported by a supporting member 150 which is deformed more easily in one direction (rearward) in the reciprocation of the driving cam plate 50 than that in the opposite direction (frontward) thereof. The supporting member 150 is inclined in one direction (frontward) toward the driving cam plate 50 which reciprocates,and is elastically supported by a pair of flexible members (e.g.synthetic resin members) 150a, 150b having flexibility so that the members can allow parallel movement of the rack gear 50a in the direction of the reciprocation. Then, the flexible member 150a in the front side is formed in a wider shape which has comparative rigidity to the flexible member 150b in the rear side is formed in a wider shape.

Figure 13B:
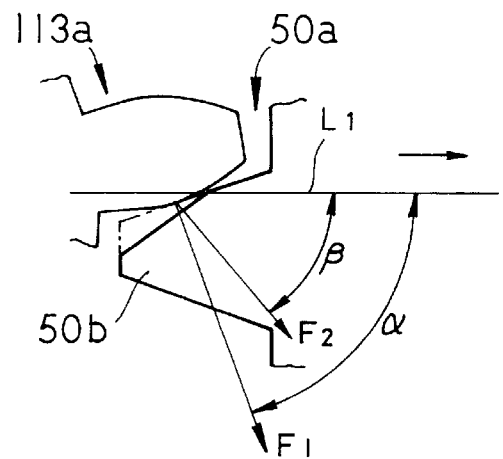
FIG. 13B is an enlarged view showing an engaging section between the rack gear and the gear wheel.

Further, as the enlarged view, which is shown in FIG. 13B, of the portion indicated by the reference character A in FIG. 13A, the rack gear 50a has each tooth group of one portion in a tooth array formed in a notched form at a portion in the front edge surface thereof in one direction (rearward) in the reciprocation of the driving cam plate 50.

To be further detailed, a direction of a force F1 which a tooth having a standard trapezoid of the rack gear 50 receives from the gear wheel 113 is inclined by an angle of α to a straight line L1 in the X-axial direction which passes through the center at which the gear wheel rotates. The angle α is, for instance, 70 degrees. A direction β is a direction of a force F2 which a notched tooth 50b with a portion thereof notched according to the embodiment receives from the gear wheel 113. The angle β is, for instance, 51 degrees. Accordingly, in the notched tooth 50b obtained by notching a portion of each tooth group in a portion of a tooth array of the rack gear 50 in the front edge surface in one direction (rear side) in the reciprocation of the driving cam plate 50, a direction of the force which the notched tooth surface receives from the gear wheel 113 can be acted on a direction indicated by the arrow (i.e. a direction leaving the gear wheel).

A description is made hereinafter for operations of the lever drive means according to the embodiment with reference to FIG. 13 to FIG. 15.

When a disk (D12) having a diameter of 12 cm is inserted into the housing by a user, a peripheral edge in the right back of the disk is engaged with the tapered member 21 of the first carrier lever 20 to cause this carrier lever 20 to slightly rotate in the counterclockwise direction.

With the rotation of this carrier lever 20, the second switch 70 is turned on through the second switch lever 60. With this trigger action, the driving motor 110 (Refer to FIG. 2) is rotated, which causes the driving cam plate 50 to move frontward in the Y-axial direction through the array of the gears 111, 112,and 113.

With the frontward movement of the driving cam plate 50, the second carrier lever 30 is rotated in the counterclockwise direction, the taper member 31 thereof is engaged with the peripheral edge of the disk so that the disk is held by both of the tapered members 21, 31, and then the disk D12 is, with further rotation of the second carrier lever 30 through the state of the disk as shown in FIG. 14, placed on the turn table to be pressed and clamped by the clamper 41 therein (Refer to FIG. 1).

When the user keeps on holding the disk D12 by his (her) hand or is going to forcibly pull it out of the slot during the disk being carried by the frontward movement of the driving cam plate 50 in the lever drive means as described above, the frontward movement of the driving cam plate 50 is prevented, but the gear wheel 113 engaged with the rack gear 50a is continuously rotating.

Then, the rack gear 50a moves, because the flexible members 150a, 150b in the front and rear sides of the supporting member 150 are elastically distorted due to the action of the load to be inclined in one direction (frontward) in the reciprocation, in parallel to the direction to which the rock gear 50a leaves the gear wheel 113, and the engagement thereof with the gear wheel 113 is released, whereby one tooth section can be allowed to be moved.

As described above, even if an excessive load is applied to the rack gear 50a, any possible damage given to the driving system including a motor or the like can be prevented.

When the disk D12 left inside the housing is forcibly ejected (emergency eject) in a state in which the power source is still cut off as shown in FIG. 15, a slim needle-like tool (not shown in the figure) is inserted into the housing through a small hole made in the front panel of the device and the driving cam plate 50 is forcefully pressed in the opposite direction (rearward) in the reciprocation thereof.

With this forcible movement of the driving cam plate 50, although the gear wheel 113 is disabled, the rack gear 50a moves, because a portion of each tooth group in a portion of the tooth array of the rack gear 50a engaged with the gear wheel 113 is notched in the front edge surface thereof in one direction (rearward), in parallel to the direction to which the rack gear 50a leaves the gear wheel 113 as shown in FIG. 13B when the rack gear is linearly moved rearward, and the engagement thereof with the gear wheel 113 is released, whereby one tooth section can be allowed to be moved.

With this forcible movement of the driving cam plate 50, a portion of the disk D12 is slightly projected outward from the slot 2, whereby an operator can easily take the disk out thereof even in the state where power is cut off.

In the disk carrier mechanism as described above, a disk can be carried in two directions, i.e. in the horizontal vertical directions only by the swinging movements of carrier levers each in the horizontal direction, which makes it possible to simplify the mechanism and to improve reliability of the functions thereof as well as to achieve low cost.

Description has been made for the present invention with reference to the preferred embodiments thereof. It should be understood by persons skilled in the art that various modifications or changes of the present invention can be thought. All of the modifications and changes which will be made are thought to be included in the scope of Claims attached to the specification.

What is claimed is:

1. A disk transfer mechanism for transferring a disk between an inserting port for insertion of the disk into a housing and a reproducing position where the disk is held on a turn-table for reproduction, the disk transfer mechanism comprising:
    a pair of carrier levers swinging within a plane substantially parallel to a major surface of said turn-table;
    abutting members provided at free ends of the carrier levers, respectively, the abutting members, in cooperation with each other, abutting onto substantially opposing peripheral edge sections of the disk at different spots in a disk-transferring direction to hold the disk; and
    lever drive means for causing said carrier levers to swing and to hold and transfer the disk with said abutting members in conjunction with each other, wherein said lever drive means functions to cause said carrier levers to swing in the same direction during a disk-transferring stroke to the reproducing position and then, after the disk reaches over the reproducing position, to cause said carrier levers to swing in opposite directions to each other thereby to release the disk from between said abutting members;
    wherein each of said abutting members has an inclined surface so that, in cooperation with said lever drive means, the disk can be moved in a direction perpendicular to a major surface of the disk when said carrier levers are swung so as to approach the substantially opposing peripheral edge sections of the disk or to move away from the substantially opposing peripheral edge sections of the disk.

2. A disk transfer mechanism according to claim 1; wherein each of said abutting members has a portion of a tapered face in a conical form.

3. A disk transfer mechanism according to claim 1; wherein each of said abutting members has a restricting piece for restricting movement of the disk in the direction perpendicular to the major surface of the disk within a specified extent.

4. A disk transfer mechanism according to claim 3; wherein at least one of said restricting pieces is positioned below the disk under a condition in which said abutting members are disengaged from the peripheral edge sections of the disk.

5. A disk transfer mechanism according to claim 1, wherein said lever drive means functions to cause said carrier levers to swing in the same direction thereby to cause the disk to move in a plane substantially parallel to the major surface of said turn-table.

6. A disk transfer mechanism for transferring a disk between an inserting port for insertion of the disk into a housing and a reproducing position where the disk is held on a turn-table for reproduction, the disk transfer mechanism comprising:
    a pair of carrier levers swinging within a plane substantially parallel to a major surface of said turn-table;
    abutting members provided at free ends of the carrier levers, respectively the abutting members, in cooperation with each other, abutting onto substantially opposing peripheral edge sections of the disk at different spots in a disk-transferring direction to hold the disk; and
    lever drive means for causing said carrier levers to swing and to hold and transfer the disk with said abutting members in conjunction with each other, wherein said lever drive means comprises:
    a driving cam plate which can freely reciprocate;
    a rack gear supported by a supporting member that is more easily deformed in one direction of said reciprocation than that in the opposite direction thereof; and
    a pinion gear engaged with said rack gear;
    wherein said lever drive means functions to cause said carrier levers to swing in the same direction during a disk-transferring stroke to the reproducing position and then, after the disk reaches over the reproducing position, to cause said carrier levers to swing in opposite directions to each other thereby to release the disk from between said abutting members;
    wherein each of said abutting members has an inclined surface so that, in cooperation with said lever drive means, the disk can be moved in a direction perpendicular to a major surface of the disk when said carrier levers are swung so as to approach the substantially opposing peripheral edge sections of the disk or to move away from the substantially opposing peripheral edge sections of the disk.

7. A disk transfer mechanism according to claim 6, wherein the supporting member for said rack gear is inclined in one direction of said reciprocation and is elastically or resiliently supported by flexible members which have flexibility so that parallel movement of said rack gear in the direction of said reciprocation can be allowed.

8. A disk transfer mechanism according to claim 7, wherein said rack gear has a plurality of teeth, and each tooth of said rack gear is notched along a front edge surface thereof in said one direction.

9. A disk transfer mechanism according to claim 6, wherein said rack gear has a plurality of teeth, and each tooth of said rack gear is notched along a front edge surface thereof in said one direction.

10. A disk carrier mechanism for carrying a disk between an inserting port for insertion of the disk into a housing and a reproducing position where the disk is held on a turntable for reproduction, the disk carrier mechanism comprising:
    a pair of carrier levers swinging within a plane substantially parallel to a major surface of said turn-table;
    lever drive means for causing said carrier levers to swing thereby to hold and carry the disk, wherein the lever drive means includes:
    a driving cam plate which can freely reciprocate,
    a rack gear supported by a supporting member that is more easily deformed in one direction of said reciprocation than that in the opposite direction thereof, and
    a pinion gear engaged with said rack gear; and
    abutting members provided at free ends of the carrier levers, respectively, the abutting members abutting onto a peripheral edge section of the disk at respective spots for holding the disk in cooperation with each other;

wherein each of said abutting members has an inclined surface so that, in cooperation with said lever drive means, the disk can be moved in a direction perpendicular to a major surface of the disk when said carrier levers are swung so as to approach the peripheral edge sections of the disk or to move away from the peripheral edge sections of the disk.

11. A disk carrier mechanism according to claim 10, wherein the supporting member for said rack gear is inclined in one direction of said reciprocation and is elastically or resiliently supported by flexible members which have flexibility so that parallel movement of said rack gear in the direction of said reciprocation can be allowed.

12. A disk carrier mechanism according to claim 11, wherein said rack gear has a plurality of teeth, and each tooth of said rack gear is notched along a front edge surface thereof in said one direction.

13. A disk carrier mechanism according to claim 10, wherein said rack gear has a plurality of teeth, and each tooth of said rack gear is notched along a front edge surface thereof in said one direction.

* * * * *